United States Patent
Lee et al.

(10) Patent No.: US 10,101,609 B2
(45) Date of Patent: Oct. 16, 2018

(54) PIXEL STRUCTURE UTILIZING NANOWIRE GRID POLARIZERS WITH MULTIPLE DOMAIN VERTICAL ALIGNMENT

(71) Applicant: a.u. Vista, Inc., Milpitas, CA (US)

(72) Inventors: Seok-Lyul Lee, Hsin-chu (TW);
Fang-Chen Luo, Milpitas, CA (US);
Adiel Abileah, Milpitas, CA (US);
Willem Den Boer, Milpitas, CA (US)

(73) Assignee: A.U. VISTA, INC., Milpitas, CA (US)

( * ) Notice: Subject to any disclaimer, the term of this patent is extended or adjusted under 35 U.S.C. 154(b) by 181 days.

(21) Appl. No.: 15/331,012

(22) Filed: Oct. 21, 2016

(65) Prior Publication Data
US 2018/0113359 A1    Apr. 26, 2018

(51) Int. Cl.
*G02F 1/1343* (2006.01)
*G02F 1/1337* (2006.01)
*G02F 1/1335* (2006.01)
*G02F 1/1368* (2006.01)
*G02F 1/1333* (2006.01)

(52) U.S. Cl.
CPC ...... *G02F 1/133528* (2013.01); *G02F 1/1368* (2013.01); *G02F 1/133345* (2013.01); *G02F 1/133512* (2013.01); *G02F 1/133514* (2013.01); *G02F 1/133707* (2013.01); *G02F 1/134336* (2013.01); *G02F 2001/133548* (2013.01); *G02F 2201/121* (2013.01); *G02F 2201/123* (2013.01)

(58) Field of Classification Search
CPC ... G02F 1/133707; G02F 2001/133548; G02F 1/134336; G02F 1/133528
See application file for complete search history.

(56) References Cited

U.S. PATENT DOCUMENTS

| | | | | |
|---|---|---|---|---|
| 2002/0167619 A1* | 11/2002 | Bietsch | ............. | G02F 1/133621 349/1 |
| 2003/0071952 A1* | 4/2003 | Yoshida | ............ | G02F 1/134363 349/141 |
| 2004/0004690 A1* | 1/2004 | Yamaguchi | ....... | G02F 1/133707 349/141 |

(Continued)

FOREIGN PATENT DOCUMENTS

CN    104538412 A    4/2015

*Primary Examiner* — Jia Pan
(74) *Attorney, Agent, or Firm* — Tim Tingkang Xia, Esq.; Locke Lord LLP

(57) ABSTRACT

A pixel structure for a liquid crystal display (LCD) device with multiple domain vertical alignment, including multiple pixels having liquid crystal molecules with a negative dielectric constant anisotropy. For each pixel, the pixel electrode and the common electrode are each divided into at least N corresponding domains, and each domain is formed by a directional nanowire grid polarizer (NWGP). The directional NWGP of each domain of the pixel electrode has a first planar direction. The directional NWGP of each domain of the common electrode has a second planar direction substantially perpendicular to the first planar direction of the corresponding domain of the pixel electrode. When the pixel is driven by a voltage difference, the directional NWGPs function as polarizers, such that an orientation of the liquid crystal molecules between the NWGPs is about (360/N) degrees from each of the first and second planar directions.

21 Claims, 16 Drawing Sheets

(56) References Cited

U.S. PATENT DOCUMENTS

| | | | |
|---|---|---|---|
| 2008/0017884 A1* | 1/2008 | Jeong | G02F 1/133528 257/203 |
| 2011/0141422 A1* | 6/2011 | Yanagawa | G02F 1/133536 349/139 |
| 2015/0014693 A1 | 1/2015 | Lee et al. | |
| 2015/0331297 A1 | 11/2015 | Han et al. | |

* cited by examiner

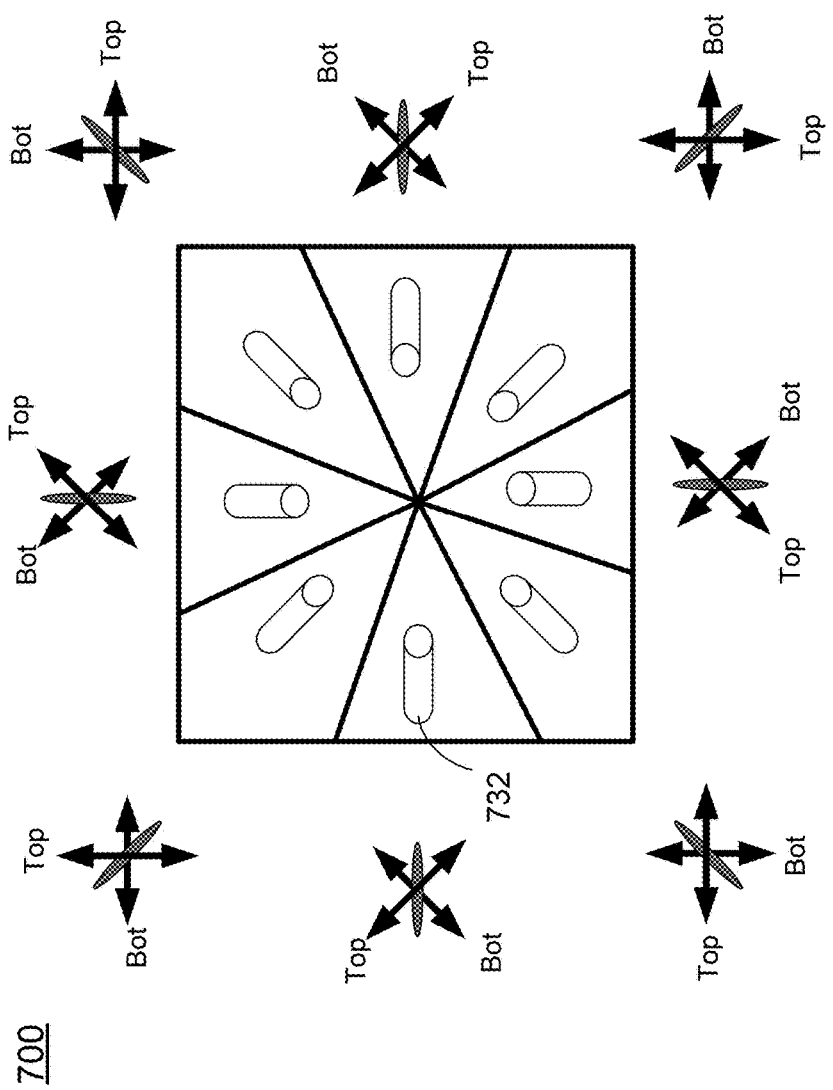

PIXEL STRUCTURE UTILIZING NANOWIRE GRID POLARIZERS WITH MULTIPLE DOMAIN VERTICAL ALIGNMENT

FIELD

The disclosure relates generally to liquid crystal display (LCD) technology, and more particularly to a LCD device having a pixel structure utilizing nanowire grid polarizers (NWGPs) with multiple domain vertical alignment, where the optical axis of the NWGPs in each domain is different.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, liquid crystal displays (LCDs) are commonly used as display devices. The LCD is capable of displaying images with good quality while consuming lower electrical power, and is thus used often as the display devices of battery powered electronic devices, such as laptop computers, mobile phones, digital cameras and other portable devices.

In a vertically-aligned (VA) LCD, the pixel structure is formed with a negative liquid crystal material and a vertical alignment film. When no voltage is applied, the liquid crystal molecules are aligned in a vertical direction, and the LCD displays a black screen. On the other hand, when a predetermined voltage is applied, the liquid crystal molecules are aligned in a horizontal direction, and the LCD displays a white screen. A contrast in display offered by the VA LCD is higher than that offered by the LCD in a twisted nematic (TN) mode, and a response speed of the VA LCD is also relatively fast. The VA LCD also provides an excellent viewing angle characteristics for white display and black display. The VA LCD is therefore attracting attention as a novel mode for a LCD.

However, the pixel structure of the VA LCD requires a protrusion layer (or a bump layer) on the color filter substrate to divide the liquid crystal layer into multiple domains, in order to avoid gray scale inversion at an off viewing axis. This makes low transmittance of the LCD caused by the liquid crystal axis at an out of angles from 45 degrees with the polarizer axis.

Therefore, a heretofore unaddressed need exists in the art to address the aforementioned deficiencies and inadequacies.

SUMMARY

One aspect of the disclosure relates to a pixel structure of a liquid crystal display (LCD) device, which includes: a first substrate and a second substrate spaced apart to each other; and a liquid crystal layer disposed between the first substrate and the second substrate and having liquid crystal molecules. In certain embodiments, the liquid crystal layer defines a plurality of pixels, and each of the plurality of pixels includes: a pixel electrode disposed on the first substrate and facing the liquid crystal layer, wherein the pixel electrode is divided into N first domains, N being a positive integer greater than or equal to 8; a common electrode disposed on the second substrate and facing the liquid crystal layer, wherein the common electrode is divided into 8 second domains, each of the N second domains of the common electrode correspond to a corresponding one of the N first domains of the pixel electrode along a vertical direction substantially perpendicular to the first substrate, wherein: each of the N first domains of the pixel electrode and each of the N second domains of the common electrode is formed by a directional nanowire grid polarizer (NWGP); the directional NWGP of each of the N first domains of the pixel electrode has a first planar direction substantially perpendicular to the vertical direction, wherein the first planar directions of the directional NWGPs of the N first domains are different from one another, and for each of the N first domains of the pixel electrode, the first planar direction of the directional NWGP of the first domain is about (360/N) degrees from the first planar directions of the directional NWGPs of the two neighboring first domains, respectively; and the directional NWGP of each of the N second domains of the common electrode has a second planar direction substantially perpendicular to the vertical direction and the first planar direction of the directional NWGP of the corresponding first domain of the pixel electrode; a thin-film transistor (TFT) disposed on the first substrate, having a gate, a source and a drain, wherein the drain of the TFT is electrically connected to the directional NWGPs of the N first domains of the pixel electrode; and a protrusion disposed on the common electrode and facing the liquid crystal layer, wherein the N second domains of the common electrode are disposed around the protrusion. When the pixel electrode and the common electrode are driven by a voltage difference provided by the TFT, the directional NWGPs of the N first domains and the N second domains function as polarizers, such that an orientation of the liquid crystal molecules between each of the N first domains and the corresponding second domain is about (360/N) degrees from the first planar direction and about (360/N) degrees from the second planar direction.

In certain embodiments, each of the pixels further includes: a color filter layer disposed between the second substrate and the common electrode; and a black matrix disposed on the second substrate facing the liquid crystal layer, wherein the black matrix covers an area of the second substrate exposed by the common electrode.

In certain embodiments, a wire grid pitch of the directional NWGP is no greater than 200 nm.

In certain embodiments, a thickness of the liquid crystal layer along the vertical direction is about 3.5 um, and the protrusion has a width of about 10 um and a height of about 1.2 um.

In certain embodiments, each of the pixels further includes: a storage capacitance electrode disposed between the first substrate and the pixel electrode; and a passivation layer disposed between the storage capacitance electrode and the pixel electrode, wherein the storage capacitance electrode is formed by the directional NWGP.

In certain embodiments, the storage capacitance electrode is divided into N third domains, each of the N third domains of the storage capacitance electrode correspond to a corresponding one of the N first domains of the pixel electrode along the vertical direction; each of the N third domains of the storage capacitance electrode is formed by the directional NWGP; and the directional NWGP of each of the N third domains of the storage capacitance electrode has a third planar direction identical to the first planar direction of the directional NWGP of the corresponding first domain of the pixel electrode.

In certain embodiments, the liquid crystal molecules of the liquid crystal layer have a negative dielectric constant anisotropy.

In another aspect of the present disclosure, a pixel structure of a LCD device is provided. In certain embodiments, the pixel structure includes: a first substrate and a second substrate spaced apart to each other; and a liquid crystal layer disposed between the first substrate and the second substrate and having liquid crystal molecules. In certain embodiments, the liquid crystal layer defines a plurality of pixels, and each of the pixels includes two subpixels, wherein each of the pixels includes: a pixel electrode disposed on the first substrate and facing the liquid crystal layer, wherein the pixel electrode comprises two subpixel electrodes, and each of the two subpixel electrodes is divided into N first domains, such that the pixel electrode comprises (2*N) first domains, N being a positive integer greater than or equal to 8; a common electrode disposed on the second substrate and facing the liquid crystal layer, wherein the common electrode is divided into 16 second domains, each of the (2*N) second domains of the common electrode correspond to a corresponding one of the (2*N) first domains of the pixel electrode along a vertical direction substantially perpendicular to the first substrate, wherein: each of the (2*N) first domains of the pixel electrode and each of the (2*N) second domains of the common electrode is formed by a directional nanowire grid polarizer (NWGP); the directional NWGP of each of the (2*N) first domains of the pixel electrode has a first planar direction substantially perpendicular to the vertical direction, wherein the first planar directions of the directional NWGPs of the N first domains in each of the two subpixel electrodes are different from one another, and for each of the N first domains of each of the two subpixel electrode, the first planar direction of the directional NWGP of the first domain is about (360/N) degrees from the first planar directions of the directional NWGPs of the two neighboring first domains, respectively; and the directional NWGP of each of the (2*N) second domains of the common electrode has a second planar direction substantially perpendicular to the vertical direction and the first planar direction of the directional NWGP of the corresponding first domain of the pixel electrode; two thin-film transistors (TFTs) disposed on the first substrate, each having a gate, a source and a drain, wherein the drain of each of the two TFT is electrically connected to the directional NWGPs of the N first domains of the two subpixel electrodes, respectively; and two protrusions disposed on the common electrode and facing the liquid crystal layer, wherein the (2*N) second domains of the common electrode are disposed in two groups around the two protrusions; wherein when the pixel electrode and the common electrode are driven by a voltage difference provided by the two TFTs, the directional NWGPs of the (2*N) first domains and the (2*N) second domains function as polarizers, such that an orientation of the liquid crystal molecules between each of the (2*N) first domains and the corresponding second domain is about (360/N) degrees from the first planar direction and about (360/N) degrees from the second planar direction.

In certain embodiments, each of the pixels further includes: a storage capacitance electrode disposed between the first substrate and the pixel electrode; and a passivation layer disposed between the storage capacitance electrode and the pixel electrode, wherein the storage capacitance electrode is formed by the directional NWGP. In certain embodiments, the storage capacitance electrode is divided into (2*N) third domains, each of the (2*N) third domains of the storage capacitance electrode correspond to a corresponding one of the (2*N) first domains of the pixel electrode along the vertical direction; each of the (2*N) third domains of the storage capacitance electrode is formed by the directional NWGP; and the directional NWGP of each of the (2*N) third domains of the storage capacitance electrode has a third planar direction identical to the first planar direction of the directional NWGP of the corresponding first domain of the pixel electrode.

A further aspect of the present disclosure relates to a pixel structure of a LCD device. In certain embodiments, the pixel structure includes: a first substrate and a second substrate spaced apart to each other; and a liquid crystal layer disposed between the first substrate and the second substrate and having liquid crystal molecules. In certain embodiments, the liquid crystal layer defines a plurality of pixels, and each of the pixels includes: a pixel electrode disposed on the first substrate and facing the liquid crystal layer, wherein the pixel electrode is divided into N first domains, N being a positive integer greater than or equal to 8; a common electrode disposed on the second substrate and facing the liquid crystal layer, wherein the common electrode is divided into N second domains, each of the N second domains of the common electrode correspond to a corresponding one of the N first domains of the pixel electrode along a vertical direction substantially perpendicular to the first substrate; and a protrusion located on the common electrode and configured to guide the liquid crystal molecules driven by the pixel electrode and the common electrode to exhibit at least N different tilted orientations. Each of the N first domains of the pixel electrode and each of the N second domains of the common electrode is formed by a directional nanowire grid polarizer (NWGP). A first planar direction of the directional NWGP of each of the N first domains of the pixel electrode is substantially perpendicular to a second planar direction of the directional NWGP of each of the N second domains of the common electrode. For each of the N first domains of the pixel electrode, the first planar direction of the directional NWGP is about (360/N) degrees from the first planar direction of the directional NWGP of each of the two neighboring first domains of the pixel electrode; and for each of the N second domains of the common electrode, the second planar direction of the directional NWGP is about (360/N) degrees from the second planar direction of the directional NWGP of each of the two neighboring second domains of the common electrode.

In certain embodiments, the protrusion is fully located on the common electrode and is roughly in a dot shape.

In certain embodiments, each of the pixels further includes: a storage capacitance electrode disposed on the first substrate and facing the second substrate; and a passivation layer disposed between the storage capacitance electrode and the pixel electrode, wherein the storage capacitance electrode is formed by the directional NWGP. In certain embodiments, the storage capacitance electrode is divided into N third domains, each of the N third domains of the storage capacitance electrode correspond to a corresponding one of the N first domains of the pixel electrode; each of the N third domains of the storage capacitance electrode is formed by the directional NWGP; and the directional NWGP of each of the N third domains of the storage capacitance electrode has a third planar direction identical to the first planar direction of the directional NWGP of the corresponding first domain of the pixel electrode.

In certain embodiments, for each of the N first domains of the pixel electrode, the corresponding second domain of the common electrode with the second planar direction of the directional NWGP substantially perpendicular to the first planar direction of the directional NWGP of the first domain is directly facing to the first domain of the pixel electrode.

A further aspect of the present disclosure relates to a LCD device, which utilizes the pixel structure as recited above. In certain embodiments, the LCD device may be a LCD with a multiple domain vertical alignment mode.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 7C schematically shows a top view of the liquid crystal molecules of the pixel structure of a LCD device as shown in FIG. 7A according to certain embodiments of the present disclosure.

DETAILED DESCRIPTION OF THE DISCLOSURE

Figure 1:
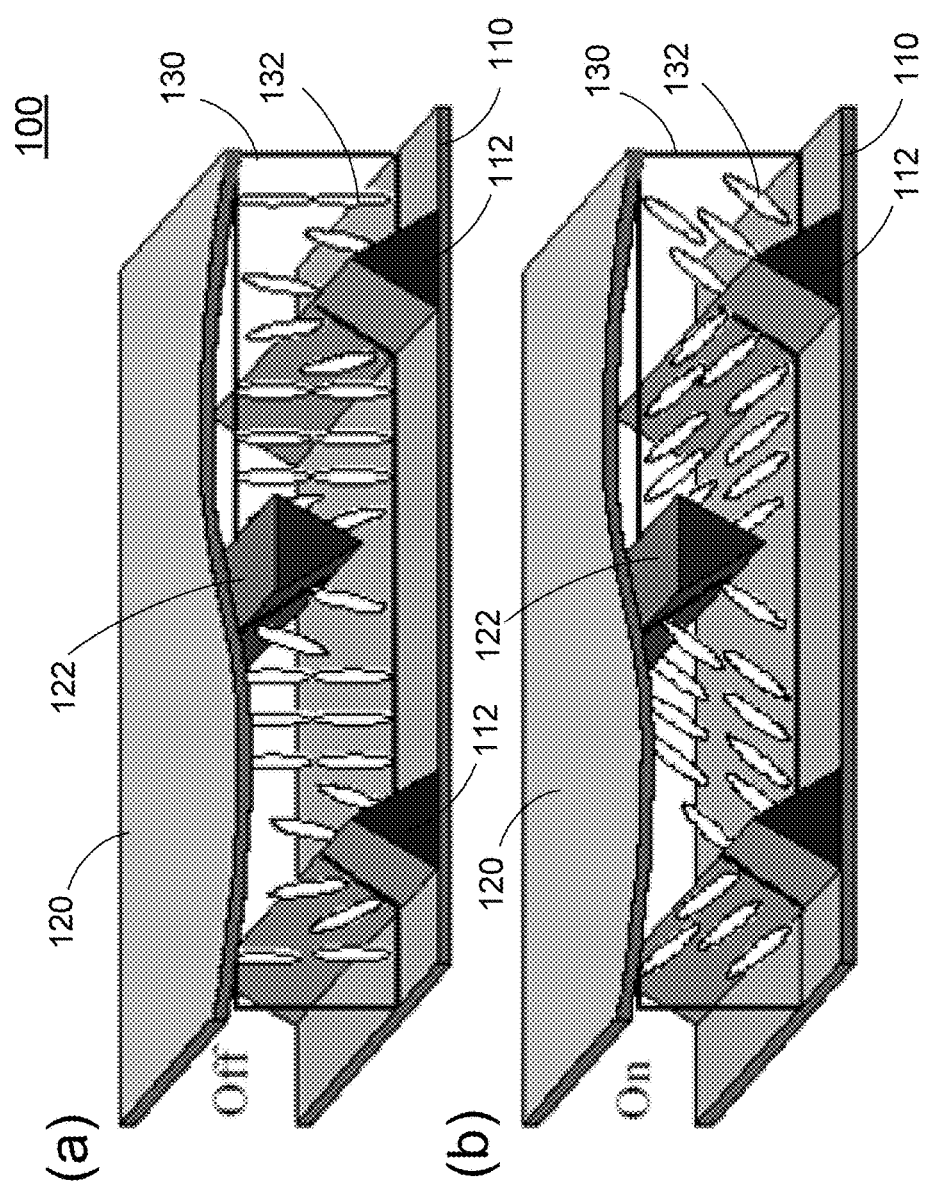
FIG. 1 schematically shows perspective views of a pixel structure of a LCD device with multiple domain vertical alignment mode in (a) an off state and (b) an on state according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a pixel structure of a LCD device having a pixel structure utilizing nanowire grid polarizers (NWGPs) with multiple domain vertical alignment, where the optical axis of the NWGPs in each domain is different.

One aspect of the present disclosure relates to a pixel structure of a LCD device. In certain embodiments, the pixel structure includes: a first substrate and a second substrate spaced apart to each other; and a liquid crystal layer disposed between the first substrate and the second substrate and having liquid crystal molecules with a negative dielectric constant anisotropy. In certain embodiments, the liquid crystal layer defines a plurality of pixels, and each of the pixels includes: a pixel electrode disposed on the first substrate and facing the liquid crystal layer, wherein the pixel electrode is divided into N first domains, N being a positive integer greater than or equal to 8; a common electrode disposed on the second substrate and facing the liquid crystal layer, wherein the common electrode is divided into N second domains, each of the N second domains of the common electrode correspond to a corresponding one of the N first domains of the pixel electrode along a vertical direction substantially perpendicular to the first substrate, wherein: each of the N first domains of the pixel electrode and each of the N second domains of the common electrode is formed by a directional nanowire grid polarizer (NWGP); the directional NWGP of each of the N first domains of the pixel electrode has a first planar direction substantially perpendicular to the vertical direction, wherein the first planar directions of the directional NWGPs of the N first domains are different from one another; and the directional NWGP of each of the N second domains of the common electrode has a second planar direction substantially perpendicular to the vertical direction and the first planar direction of the directional NWGP of the corresponding first domain of the pixel electrode; and at least one protrusion disposed on the common electrode facing the pixel electrode, wherein the N second domains of the common electrode are disposed around the at least one protrusion. In certain embodiments, when the pixel electrode and the common electrode are driven by a voltage difference, the directional NWGPs of the N first domains and the N second domains function as polarizers, such that an orientation of the liquid crystal molecules between each of the N first domains and the corresponding second domain is about 45 degrees from the first planar direction and about 45 degrees from the second planar direction.

As discussed above, the pixel structure of a vertically-aligned (VA) LCD is formed with a negative liquid crystal material and a vertical alignment film. For example, FIG. 1 schematically shows perspective views of a pixel structure of a LCD device with multiple domain vertical alignment mode in (a) an off state and (b) an on state according to certain embodiments of the present disclosure. As shown in FIG. 1, the pixel structure 100 includes two substrates, namely a first substrate 110 and a second substrate 120, which are formed to be distanced apart to each other. A plurality of protrusions (or bumps) 112 is formed on the first substrate 110, and a protrusion (or bump) 122 is formed on the second substrate 120. Further, a liquid crystal layer 130 is formed between the first substrate 110 and the second substrate 120, which includes liquid crystal molecules 132 with a negative dielectric constant anisotropy. In certain embodiments, a plurality of polarizers (not shown) may be provided to drive the liquid crystal molecules 132 of the liquid crystal layer 130. When the LCD device 100 is in an off state, as shown in FIG. 1(a), the orientations of the liquid crystal molecules 132 are in a substantially vertical direction, which makes the LCD device 100 display a black screen. On the other hand, when a predetermined voltage is applied to drive the LCD device 100 to an on state, as shown in FIG. 1(b), the liquid crystal molecules 132 rotate to be aligned in a tilting direction, and the LCD device 100 displays a white screen.

Figure 2:
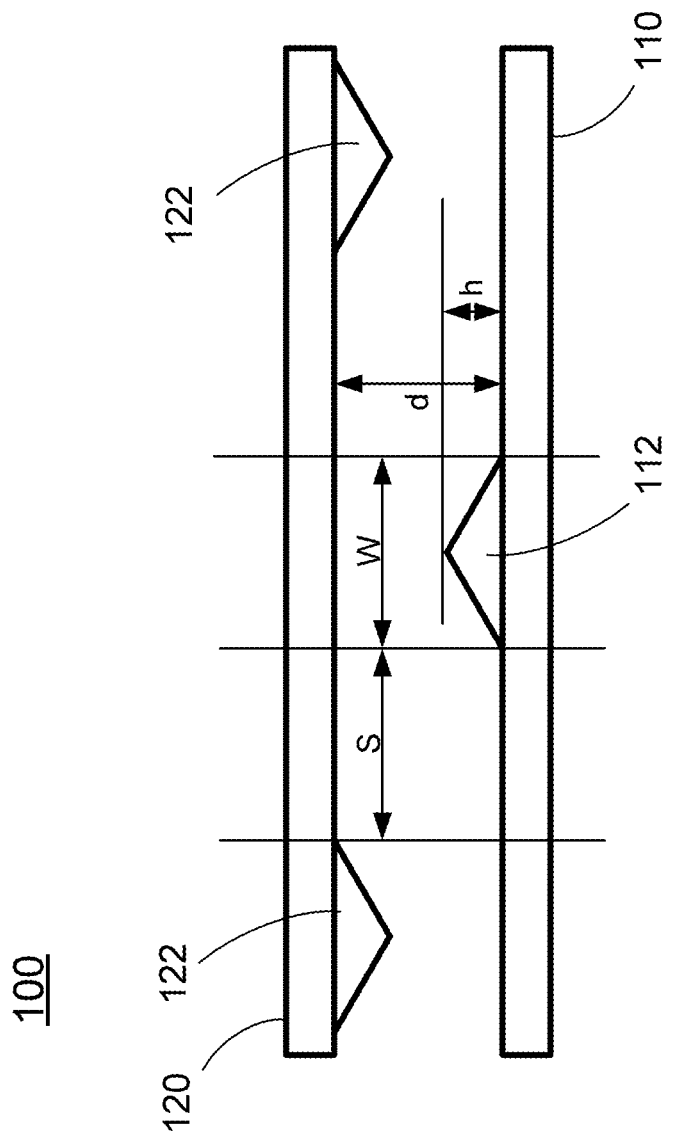
FIG. 2 schematically shows a cross-sectional view of a pixel structure of a LCD device with multiple domain vertical alignment mode according to certain embodiments of the present disclosure.

It should be particularly noted that the protrusions 112 and 122 essentially divide the liquid crystal layer 130 into multiple domains to avoid gray scale inversion at an off viewing axis. FIG. 2 schematically shows a cross-sectional view of a pixel structure of a LCD device with multiple domain vertical alignment mode according to certain embodiments of the present disclosure. As shown in FIG. 2, a plurality of parameters may be determined for domain control of the LCD device 100, including the distance d between the substrates 110 and 120, the width W and the height of the protrusions 112 and 122, and the horizontal distance of the space S between the protrusions 112 and 122.

Figure 3:
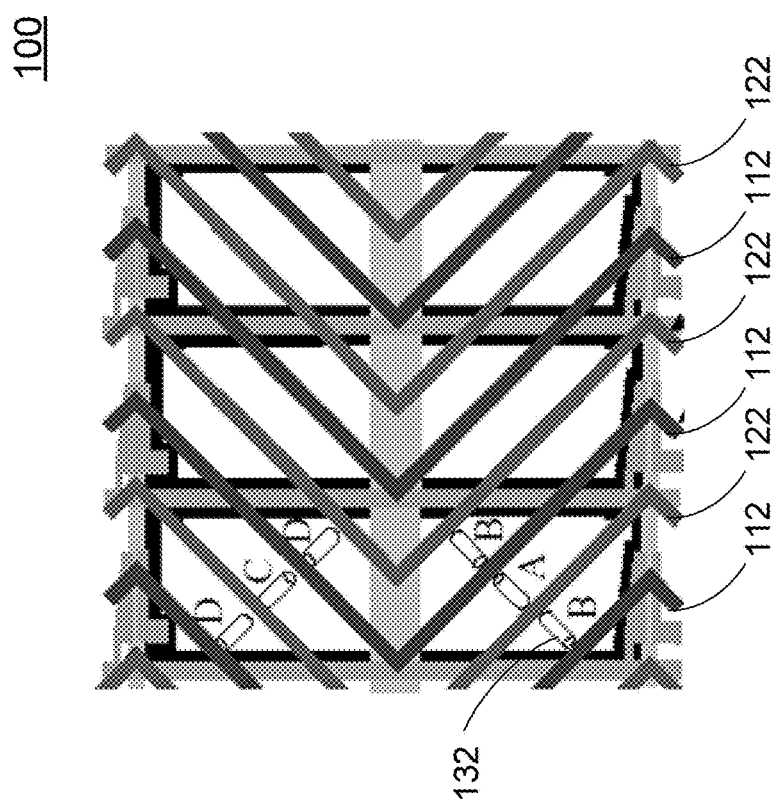
FIG. 3 schematically shows a top view of the orientation of liquid crystal molecules in a pixel structure of a LCD device with multiple domain vertical alignment mode according to certain embodiments of the present disclosure.
Figure 3:
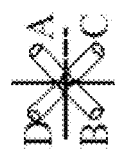

FIG. 3 schematically shows a top view of the orientation of liquid crystal molecules in a pixel structure of a LCD device with multiple domain vertical alignment mode according to certain embodiments of the present disclosure. Specifically, FIG. 3 shows that the protrusions 112 and 122 are strips aligned in a zigzag arrangement, such that the liquid crystal molecules 132 are divided into multiple domains, and the liquid crystal molecules 132 in each of the domains may be aligned in different directions (A, B, C, D).

Figure 4A:
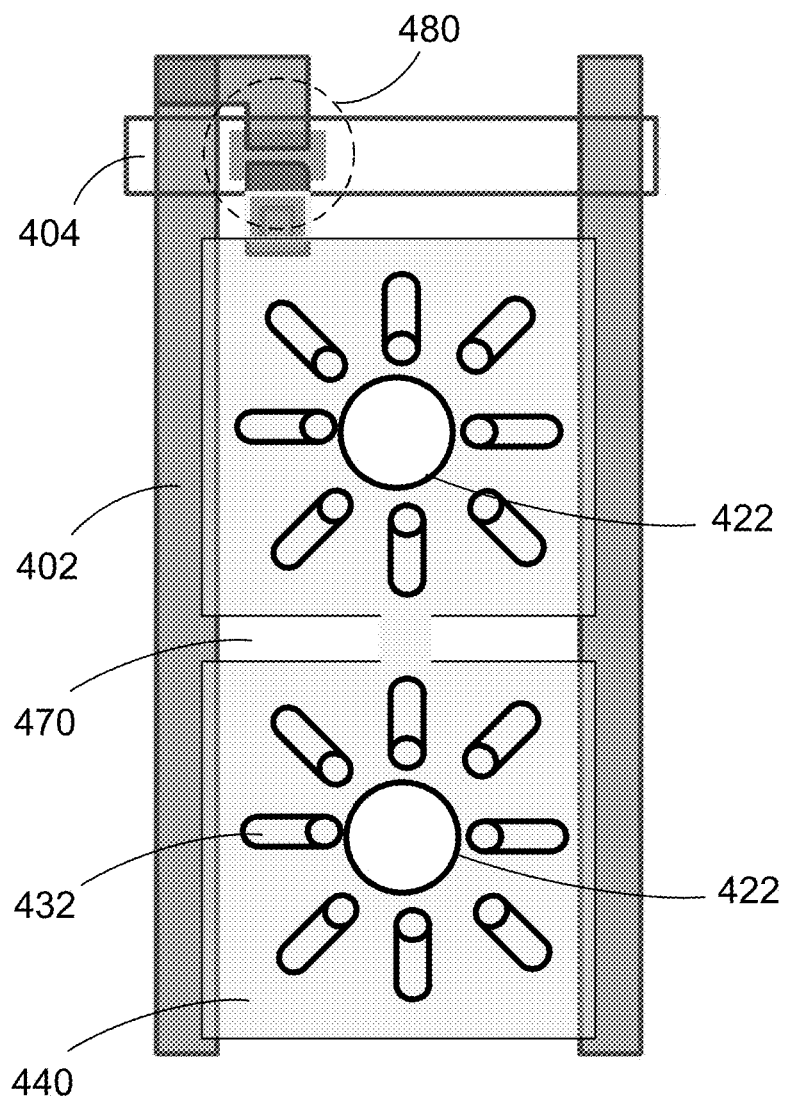
FIG. 4A schematically shows a top view of a pixel structure of a LCD device with a multiple domain vertical alignment mode according to certain embodiments of the present disclosure.
Figure 4B:
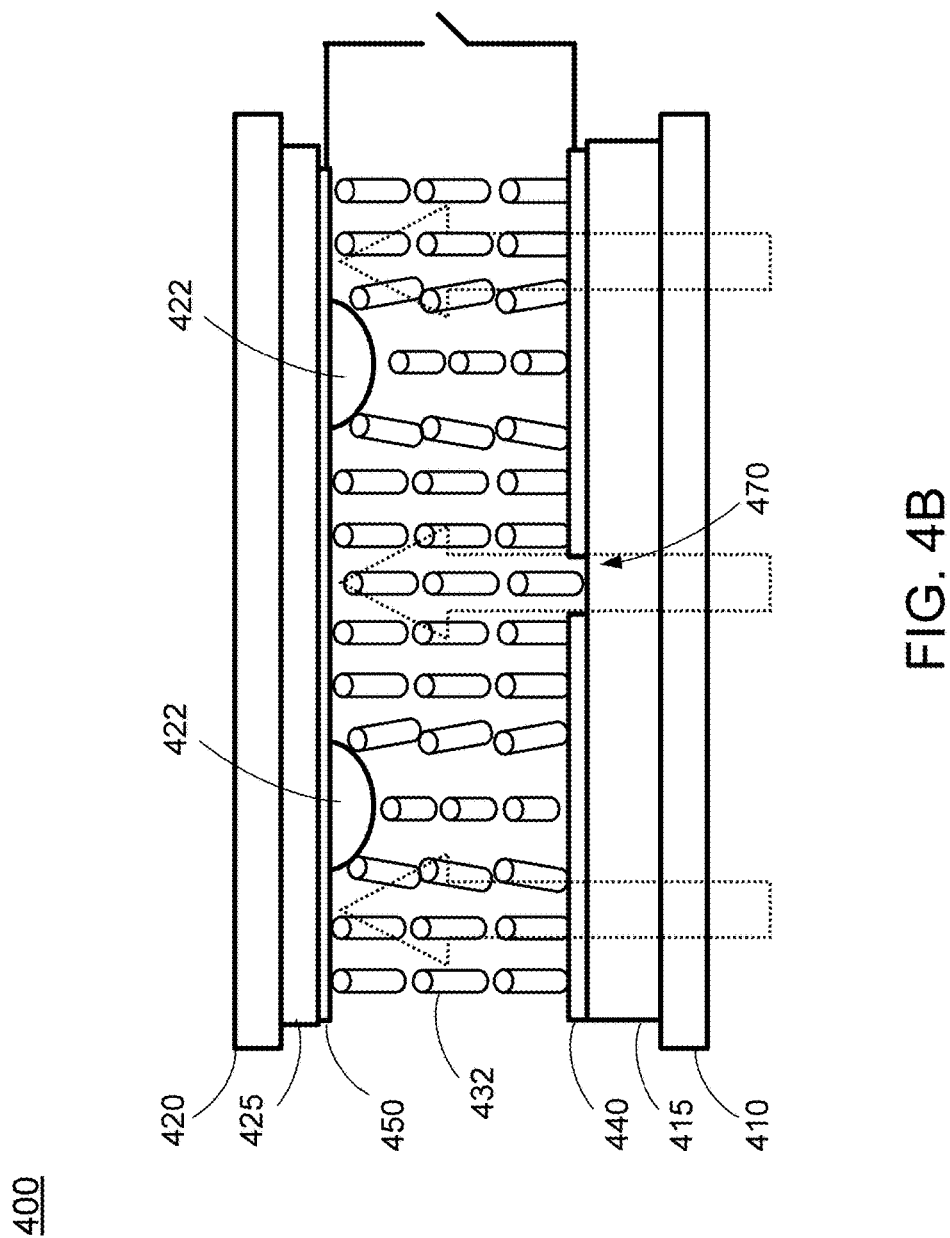
FIG. 4B schematically shows a cross-sectional view of a pixel structure of a LCD device with multiple domain vertical alignment mode in an off state according to certain embodiments of the present disclosure.
Figure 4C:
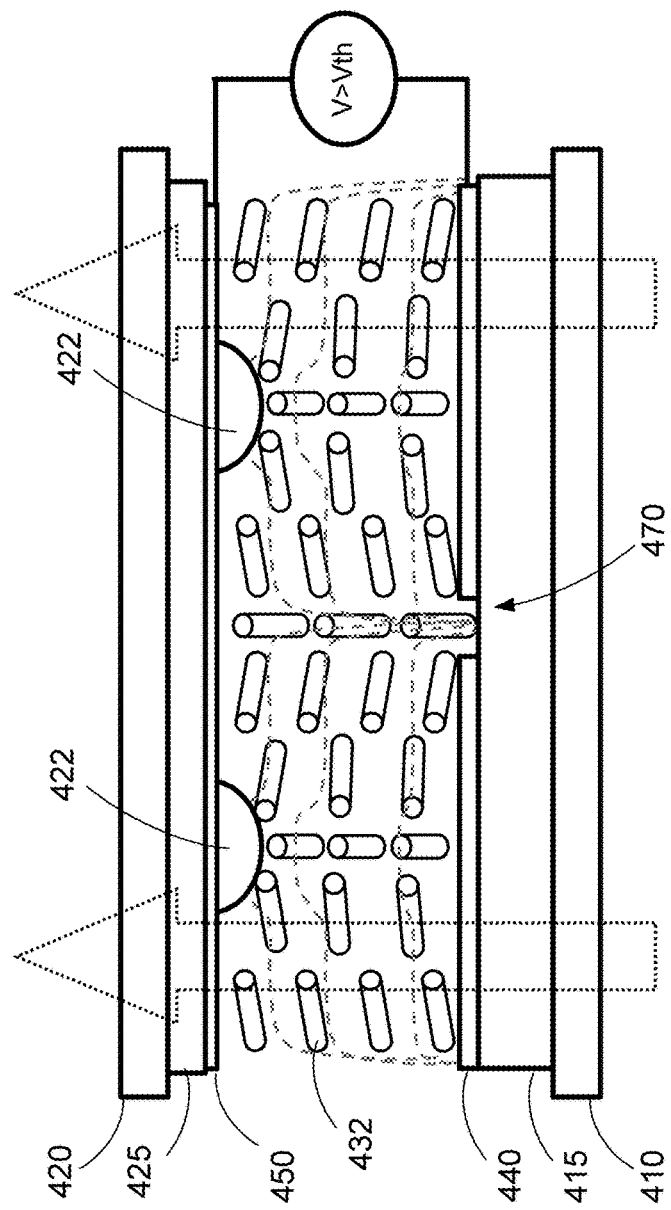
FIG. 4C schematically shows a cross-sectional view of a pixel structure of a LCD device with a multiple domain vertical alignment mode in an on state according to certain embodiments of the present disclosure.

In certain embodiments, a different multiple domain pixel structure of the LCD device is proposed. FIG. 4A schematically shows a top view of a pixel structure of a LCD device with multiple domain vertical alignment mode according to certain embodiments of the present disclosure. FIG. 4B schematically shows a cross-sectional view of a pixel structure of a LCD device with multiple domain vertical alignment mode in an off state according to certain embodiments of the present disclosure. FIG. 4C schematically shows a cross-sectional view of a pixel structure of a LCD device with multiple domain vertical alignment mode in an on state according to certain embodiments of the present disclosure. As shown in FIGS. 4A-4C, the pixel structure 400 includes a corresponding data line 402 and a corresponding gate line 404, and a transistor 480 is provided. In certain embodiments, the transistor 480 is a thin-film transistor (TFT). Further, the pixel structure 400 includes two substrates, namely a first substrate 410 and a second substrate 420, which are formed to be distanced apart to each other. On the first substrate 410 (shown at the bottom of FIGS. 4B and 4C), an ultra-high aperture (UHA) layer 415 is optionally disposed on the first substrate 410, and a plurality of pixel electrodes 440 may be formed on the UHA layer 415, forming a main slit 470 therebetween. On the second substrate 420 (shown at the top of FIGS. 4B and 4C), a color filter 425 is disposed on the second substrate 420, and a common electrode 450 is disposed on the color filter 425. A plurality of protrusions (or bumps) 422 may be formed on the common electrode 450. In certain embodiments, each of the protrusions 422 may be fully located on the common electrode 450, and may be in a dot shape or roughly in a dot shape. In certain embodiments, the pixel electrodes 440 and the common electrode 450 may be respectively formed by indium tin oxide (ITO) or other transparent electrode materials. As shown in FIG. 4B, when the LCD device 400 is in the off state, the orientations of the liquid crystal molecules 432 are in a substantially vertical direction, such that light (as shown in FIG. 4B by dotted arrows) is not allowed to penetrate the polarizers since the liquid crystal molecules does not modulate the polarization of the light into a proper state, which makes the LCD device 100 display a black screen. On the other hand, as shown in FIGS. 4A and 4C when a predetermined voltage difference V, which is greater than a threshold voltage Vth, is applied to drive the LCD device 400 to an on state, the liquid crystal molecules 432 rotate to be tilted in a substantial horizontal direction, such that light (as shown in FIG. 4C by dotted arrows) is polarized to a proper state by the liquid crystal molecules of the liquid crystal layer to be allowed to penetrate the polarizers, and the LCD device 400 displays a white screen.

Figure 5B:
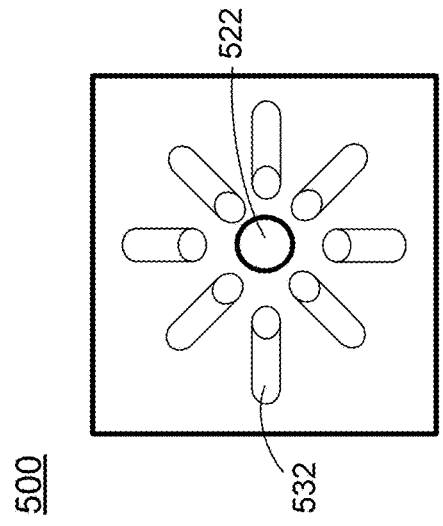
FIG. 5B schematically shows a top view of the liquid crystal molecules of the pixel structure of a LCD device as shown in FIG. 5A according to certain embodiments of the present disclosure.
Figure 5C:
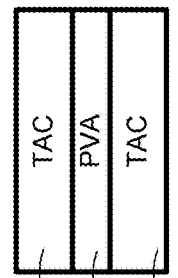
FIG. 5C schematically shows a linear polarizer according to certain embodiments of the present disclosure.
Figure 5A:
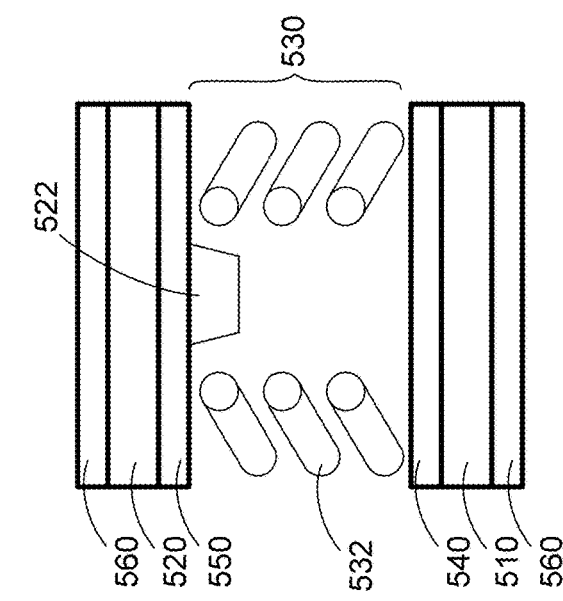
FIG. 5A schematically shows a cross-sectional view of a pixel structure of a LCD device with a multiple domain vertical alignment mode utilizing directional polarizers according to certain embodiments of the present disclosure.

In certain embodiments, the LCD device may utilize linear polarizer films. FIG. 5A schematically shows a cross-sectional view of a pixel structure of a LCD device with multiple domain vertical alignment mode utilizing directional polarizers according to certain embodiments of the present disclosure, and FIG. 5B schematically shows a top view of the liquid crystal molecules of the pixel structure of a LCD device as shown in FIG. 5A according to certain embodiments of the present disclosure. As shown in FIG. 5A, the pixel structure 500 includes two substrates, namely a first substrate 510 and a second substrate 520, which are formed to be distanced apart to each other. A pixel electrode 540 may be formed on the first substrate 510, and a common electrode 550 may be formed on the second substrate 520, facing each other. A liquid crystal layer 530 is sandwiched between the pixel electrode 540 and the common electrode 550. Further, two directional polarizers 560 are provided at the outer side of the two substrates 510 and 520 in order to control the orientation of the liquid crystal molecules 532. As shown in FIG. 5B, the liquid crystal molecules 532 of the liquid crystal layer 530 will align around the protrusion 522. FIG. 5C schematically shows a linear polarizer according to certain embodiments of the present disclosure. As shown in FIG. 5C, a linear polarizer 560 is a directional polarizer film, which may be formed by a polyvinyl alcohol (PVA) film 562 sandwiched by two triacetyl cellulose (TAC) films 565.

Figure 5D:
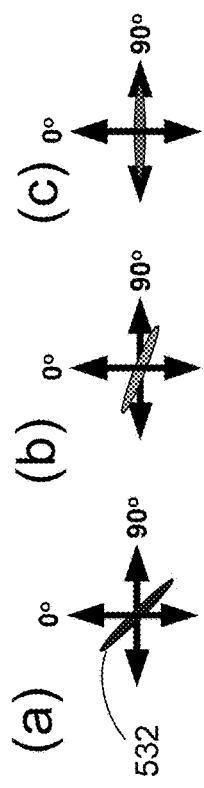
FIG. 5D schematically shows liquid crystal molecules in a relationship with the linear polarizers, where an angle between the orientation of the liquid crystal molecule and one of the polarizers is (a) 45 degrees, (b) 22.5 degrees and (c) 0 degree, according to certain embodiments of the present disclosure.

However, in the pixel structure as shown in FIGS. 5A and 5B, the liquid crystal molecules 532 at different location around the protrusion 522 may have a different angle in relation to the linear polarizers. FIG. 5D schematically shows liquid crystal molecules in a relationship with the linear polarizers, where an angle between the orientation of the liquid crystal molecule and one of the polarizers is (a) 45 degrees, (b) 22.5 degrees and (c) 0 degree, according to certain embodiments of the present disclosure. FIG. 5E schematically shows a transmittance-voltage diagram of the liquid crystal molecules as shown in FIG. 5D according to certain embodiments of the present disclosure. As shown in FIG. 5D, the two linear polarizers may be disposed to be perpendicular to each other, with one polarizer being in a 0° direction, and the other polarizer being in a 90° direction. The orientation of the liquid crystal molecules may vary. As shown in FIG. 5E, when the voltage provided to the linear polarizers, the transmittance T for the liquid crystal molecule having a 45 degree to the polarizers may be greater than other liquid crystal molecules, and the liquid crystal molecule having a 0 degree to the polarizers may have almost zero transmittance T.

Figure 5F:
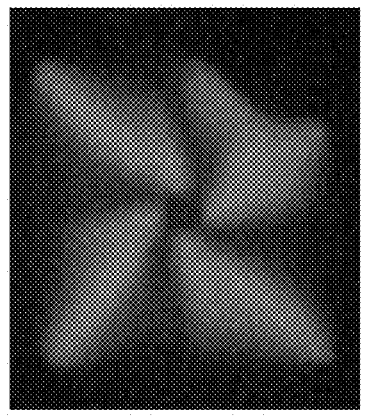
FIG. 5F shows a photo of the transmittance of the liquid crystal molecules of the pixel structure of a LCD device as shown in FIG. 5B according to certain embodiments of the present disclosure.
Figure 5E:
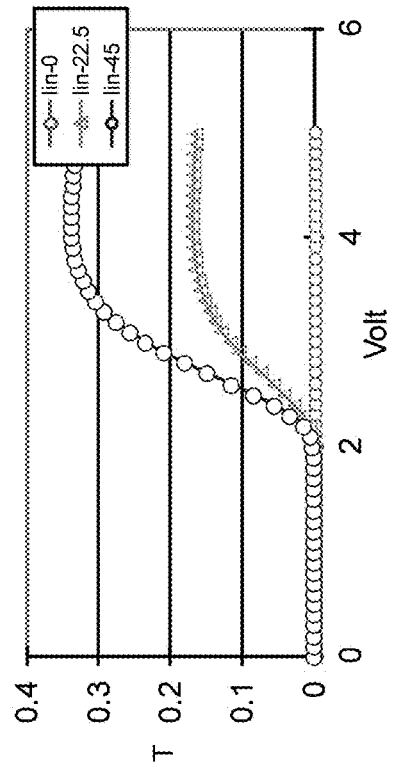
FIG. 5E schematically shows a transmittance-voltage diagram of the liquid crystal molecules as shown in FIG. 5D according to certain embodiments of the present disclosure.

FIG. 5F shows a photo of the transmittance of the liquid crystal molecules of the pixel structure of a LCD device as shown in FIG. 5B according to certain embodiments of the present disclosure. As shown in FIG. 5F, the transmittance at the 45°, 135°, 225° and 315° directions from the polarizer axis may be great. However, at the 0°, 90°, 180° and 270° directions, the transmittance is about zero, and the photograph shows significant dark areas at these directions. In other words, low transmittances may occur at the areas with these directions in relation to the polarizer axis.

Figure 6:
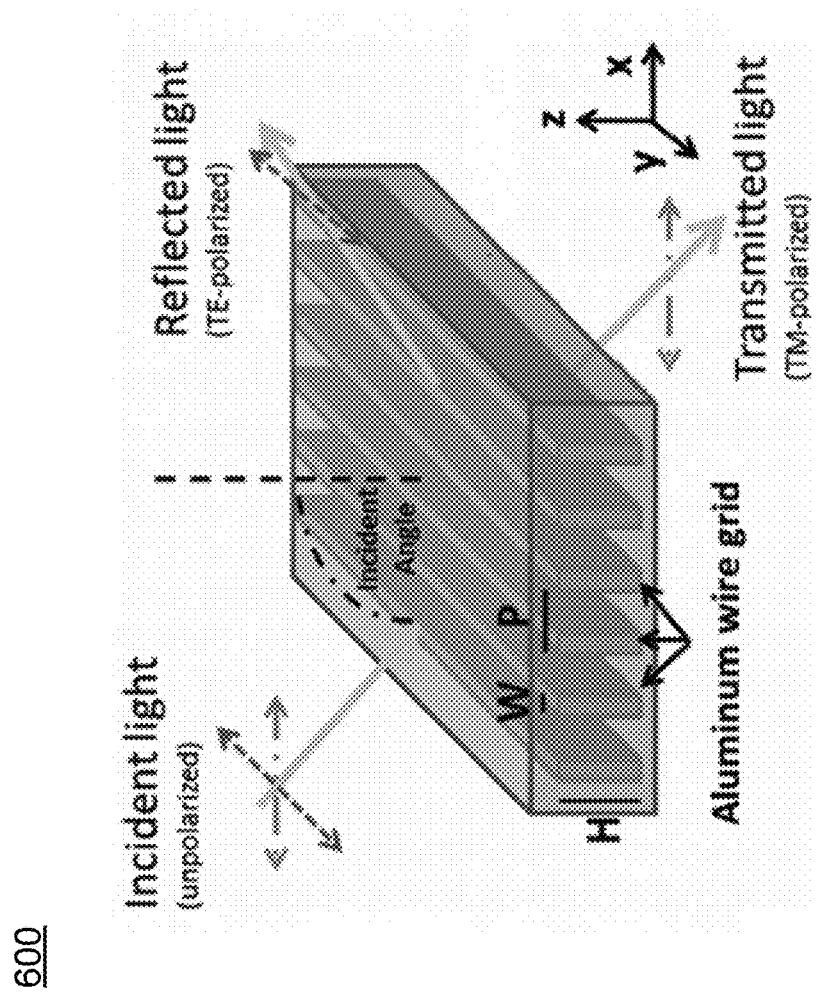
FIG. 6 schematically shows a nanowire grid polarizer according to certain embodiments of the present disclosure.

To remedy the deficiencies, certain aspects of the disclosure relate to a LCD device having a pixel structure utilizing nanowire grid polarizers (NWGPs) with multiple domain vertical alignment, where the optical axis of the NWGPs in each domain is different. FIG. 6 shows a NWGP according to certain embodiments of the present disclosure. As shown in FIG. 6, the NWGP 600 is formed by a plurality of metal wire grids, particularly aluminum wire grids, which have a pitch P, and each of the grids has a height H and a width W. When light is incident on the NWGP 600, transverse electric (TE) fields (light polarized along the direction of the aluminum wires) are reflected and transverse magnetic (TM) fields (light polarized perpendicular to the direction of the aluminum wires) are transmitted through the NWGP 600. The aluminum wires must be subwavelength, i.e., fewer than ($\lambda/2$) of the incident light, where $\lambda$ is the wavelength of the incident light. In other words, for visible light, a wire grid pitch of the NWGP is no greater than about 200 nm.

Figure 7A:
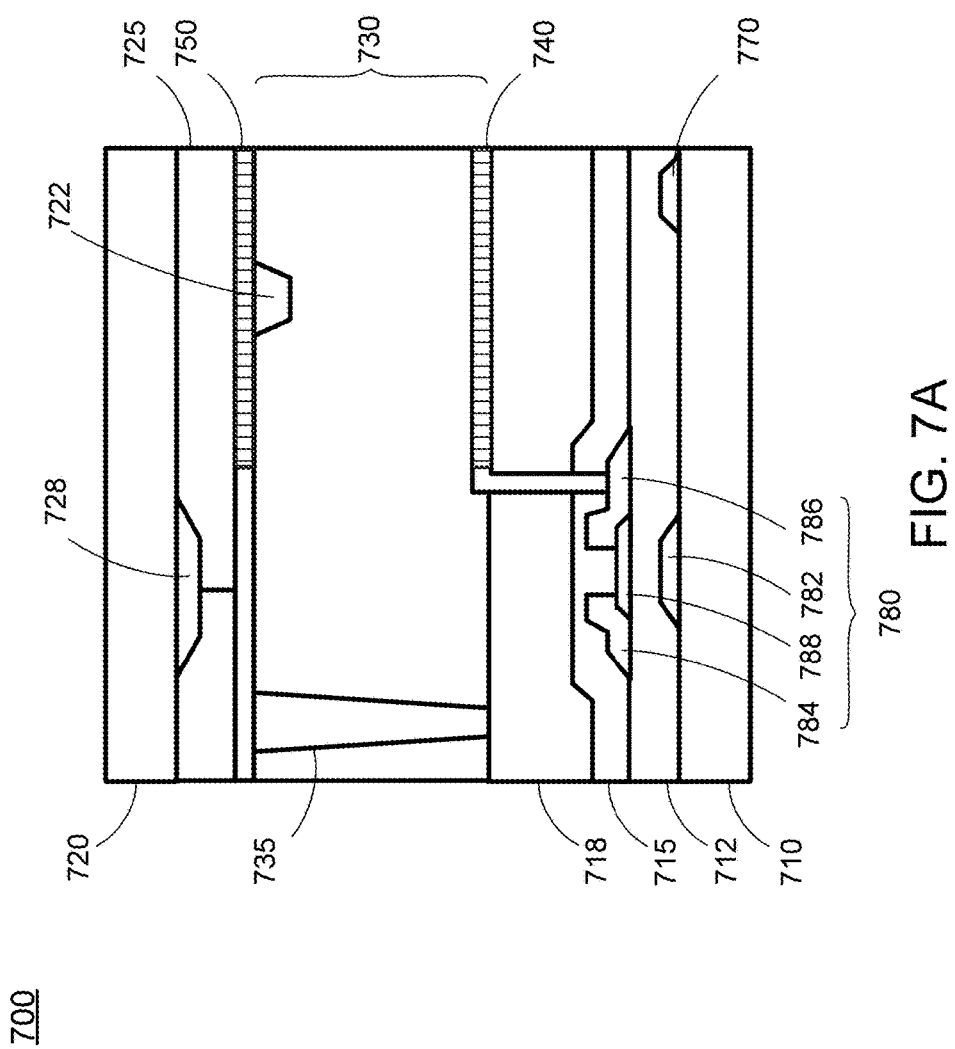
FIG. 7A schematically shows a cross-sectional view of a pixel structure of a LCD device with a multiple domain vertical alignment mode utilizing the nanowire grid polarizers as electrodes according to certain embodiments of the present disclosure.
Figure 7B:
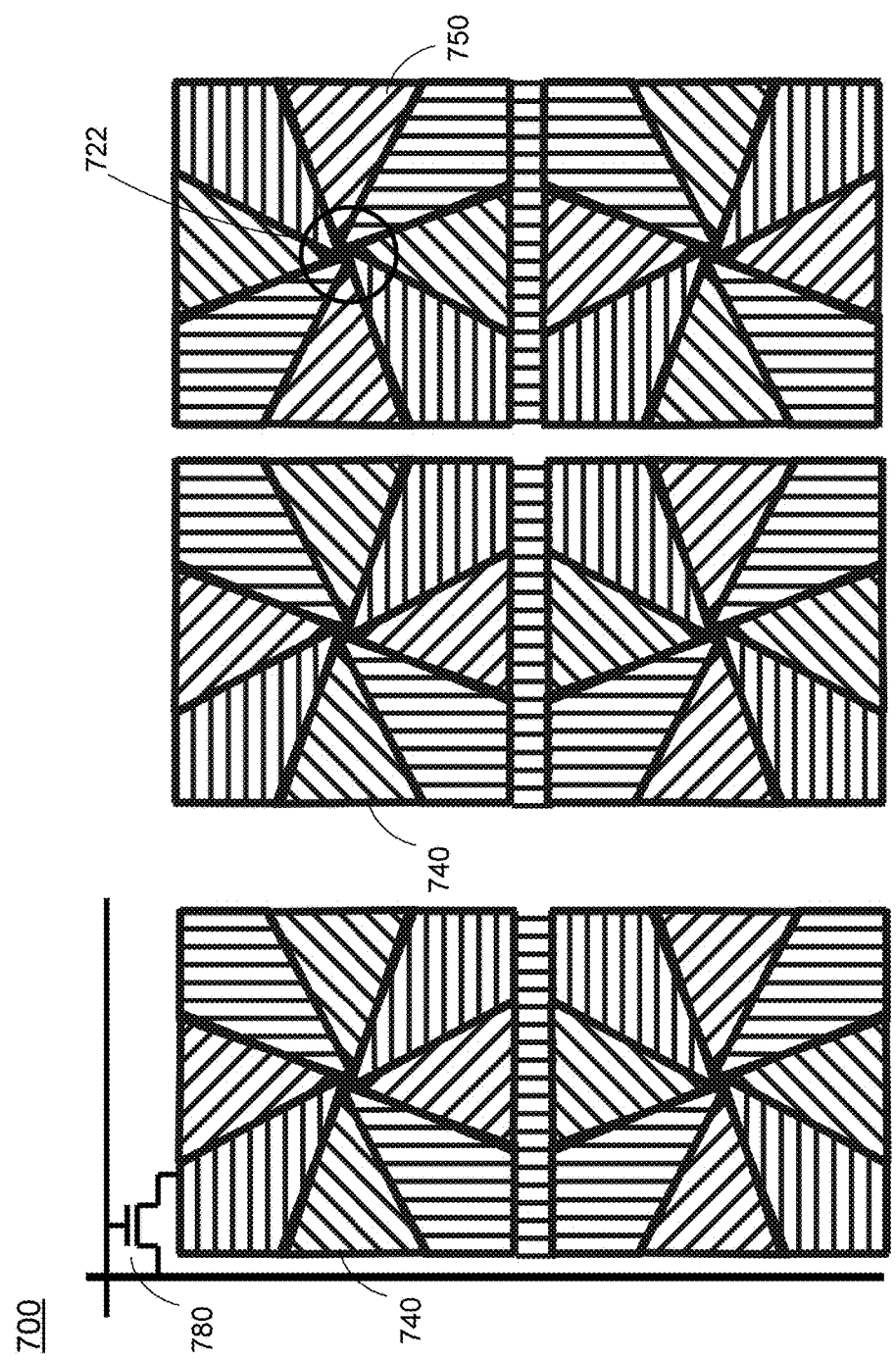
FIG. 7B schematically shows a top view of the multiple domains of the pixel electrode and the common electrode of the pixel structure of a LCD device as shown in FIG. 7A according to certain embodiments of the present disclosure.

FIG. 7A schematically shows a cross-sectional view of a pixel structure of a LCD device with a multiple domain vertical alignment mode utilizing the nanowire grid polarizers as electrodes according to certain embodiments of the present disclosure, FIG. 7B schematically shows a top view of the multiple domains of the pixel electrode and the common electrode of the pixel structure of a LCD device as shown in FIG. 7A according to certain embodiments of the present disclosure, and FIG. 7C schematically shows a top view of the liquid crystal molecules of the pixel structure of a LCD device as shown in FIG. 7A according to certain embodiments of the present disclosure.

Referring to FIGS. 7A to 7C, the pixel structure 700 includes two substrates, namely a first substrate 710 and a second substrate 720, which are formed to be distanced apart to each other. A liquid crystal layer 730 is sandwiched between the first substrate 710 and the second substrate 720. As shown in FIG. 7C, the liquid crystal layer 730 includes liquid crystal molecules 732 with a negative dielectric constant anisotropy.

Referring back to FIG. 7A, on the first substrate 710, a storage capacitance electrode 770 and a pixel electrode 740 are formed. Specifically, the storage capacitance electrode 770 is formed on the first substrate 710 and facing the liquid crystal layer 730, and a passivation layer 715 is formed between the pixel electrode 740 and the storage capacitance electrode 770, such that the pixel electrode 740 is electrically insulated from the storage capacitance electrode 770. In certain embodiments, a resin layer 718 is formed between the passivation layer 715 and the pixel electrode 740.

Further, a transistor 780 is formed on the first substrate. As shown in FIG. 7A, the transistor 780 is a thin-film transistor (TFT), which includes a gate layer 782, a source 784 and a drain 786. A gate insulator layer 712 is formed between the gate 782 and the source 784 and drain 786, and an active layer 788, is formed between the source 784 and the drain 786. In certain embodiments, the active layer 788 may be, for example, an amorphous silicon (a-Si) layer, a low-temperature polycrystalline silicon (LTPS) layer, or a metal oxide semiconductor layer. The drain 786 of the transistor 780 is electrically connected to the pixel electrode 740.

On the other hand, on the second substrate 720, a color filter 725, a black matrix (BM) 728 and a common electrode 750 are formed. Specifically, the color filter 725 is formed on the second substrate 720 facing the liquid crystal layer 730, and the common electrode 750 is formed on the color filter 725. The BM 728 is formed on the second substrate 730 facing the liquid crystal layer 730 in order to cover an area of the second substrate 728 exposed by the common electrode 750. In certain embodiments, the color filter 725 may be a RGB color filter. In certain embodiments, the color filter 725 may be formed between the pixel electrode 740 and the passivation layer 715. Further, a protrusion 722 is disposed on the common electrode 750. Further, a photo spacer (PS) 735 is disposed between the color filter 725 and the resin layer 718.

As shown in FIG. 7B, each of the pixel electrode 740 and the common electrode 750 is divided into multiple domains, and each domain is formed by a directional NWGP. Specifically, the pixel structure as shown in FIG. 7B is similar to that of FIG. 4A, where the pixel structure includes two regions. For each region, the pixel electrode 740 and the common electrode 750 are each divided into 8 corresponding domains around the protrusion 722, where each domain of the common electrode 750 corresponds to a corresponding domain of the pixel electrode 740 along a vertical direction of the LCD device 700 (i.e., the vertical direction as shown in FIG. 7A), and each domain is formed by a directional NWGP. For distinguishing purposes, the domains of the pixel electrode 740 are referred to as the first domains, and the domains of the common electrode 750 are referred to as the second domains. As shown in FIG. 7B, the directional NWGP of each of the 8 first domains of the pixel electrode 740 has a first planar direction, which is substantially perpendicular to the vertical direction of the LCD device 700 (i.e., the vertical direction as shown in FIG. 7A). Each of the first planar directions of the directional NWGPs of the 8 first domains is different from one another. Specifically, for each of the 8 first domains of the pixel electrode 740, the first planar direction of the directional NWGP of the first domain is about 45 degrees from the first planar directions of the directional NWGPs of the two neighboring first domains, respectively. On the other hand, the directional NWGP of each of the 8 second domains of the common electrode 750 has a second planar direction, which is substantially perpendicular to the vertical direction of the LCD device 700, and substantially perpendicular to the first planar direction of the directional NWGP of the corresponding first domain of the pixel electrode 740. The first and second planar directions of each direction NWGP are more clearly shown in FIG. 7C, where the first planar direction of each directional NWGP of each first domain of the pixel electrode 740 is labeled as "bot" and the second planar direction of each directional NWGP of each second domain of the common electrode 750 is labeled as "top".

As shown in FIG. 7C, when the transistor 780 drives the pixel electrode 740 to create a voltage difference between the pixel electrode 740 and the common electrode 750, the directional NWGPs of the 8 first domains of the pixel electrodes 740 and the directional NWGPs of the 8 second domains of the common electrodes 750 function as polarizers to drive the liquid crystal molecules 732 of the liquid crystal layer 730, such that an orientation of the liquid crystal molecules 732 between each of the 8 first domains and the corresponding second domain is about 45 degrees from the first planar direction ("bot") and about 45 degrees from the second planar direction ("top"). In this case, there will be an angle of 45 degrees between the orientation of the liquid crystal molecules 732 and the corresponding optical axis of the polarizers (i.e., the NWGPs) in order to maintain a high transmittance for all domains. It is noted that the orientations of the liquid crystal in the plurality of domains in certain embodiments are guided by the protrusions and change gradually, not suddenly. That is to say, there might be no exact boundary of the orientations of the liquid crystal as remarked in the drawings.

As discussed above, for each of the corresponding domains of the common electrode 750 and the pixel electrode 740, the second planar direction of the directional NWGP of each of the 8 second domains of the common electrode 750 is substantially perpendicular to the first planar direction of the directional NWGP of the corresponding first domain of the pixel electrode 740. It should be noted that the term "substantially perpendicular" means that the first planar direction does not always have to be exactly perpendicular to the second planar direction. In certain embodiments, for example, the second planar direction of the directional NWGP of each of the 8 second domains of the common electrode 750 may form a substantially perpendicular angle to the first planar direction of the directional NWGP of the corresponding first domain of the pixel electrode 740, and the substantially perpendicular angle may be in a range between 80° to 100°.

Figure 8A:
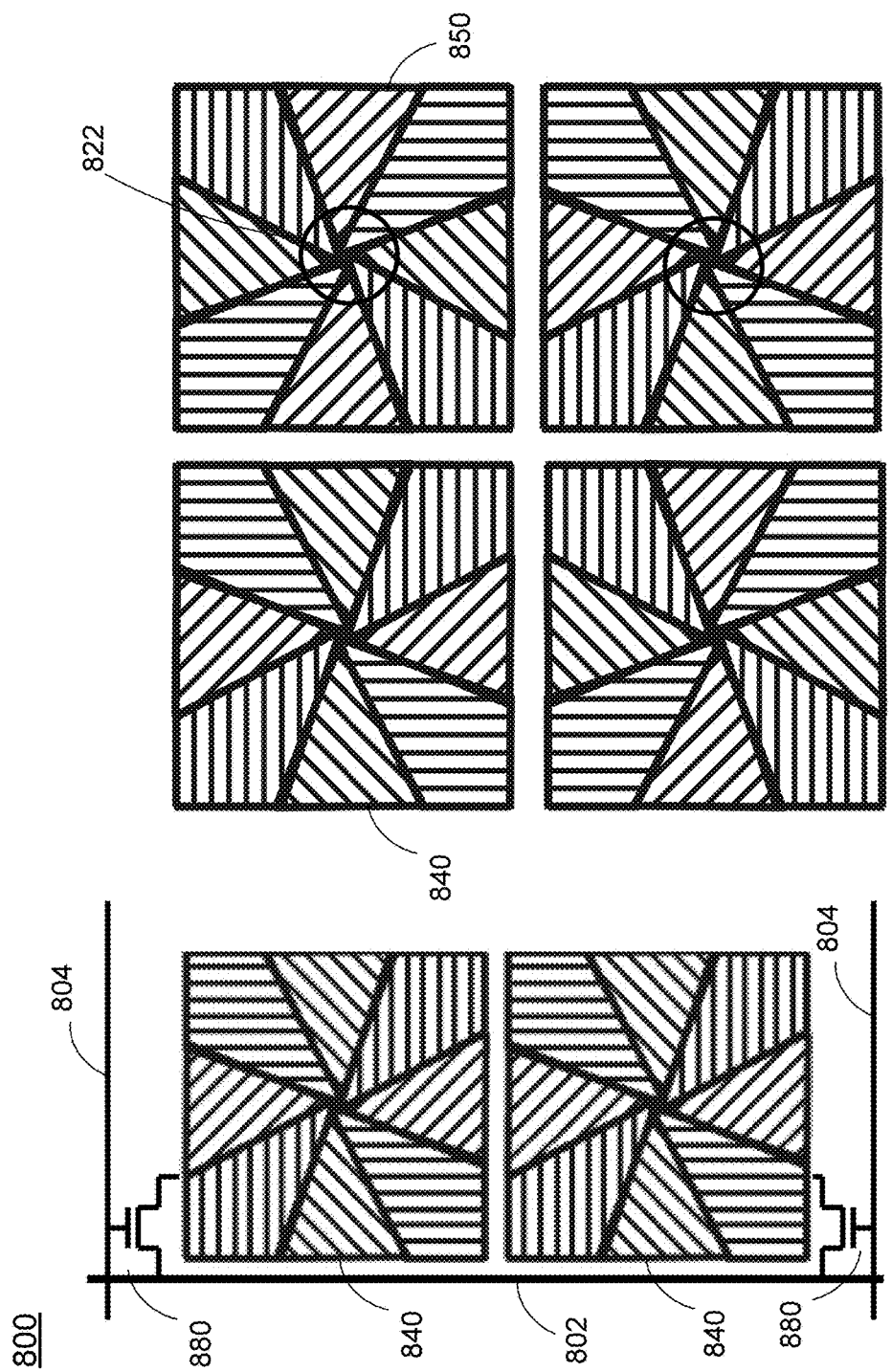
FIG. 8A schematically shows a top view of the multiple domains of the pixel electrode and the common electrode of the pixel structure of a LCD device according to certain embodiments of the present disclosure.
Figure 8B:
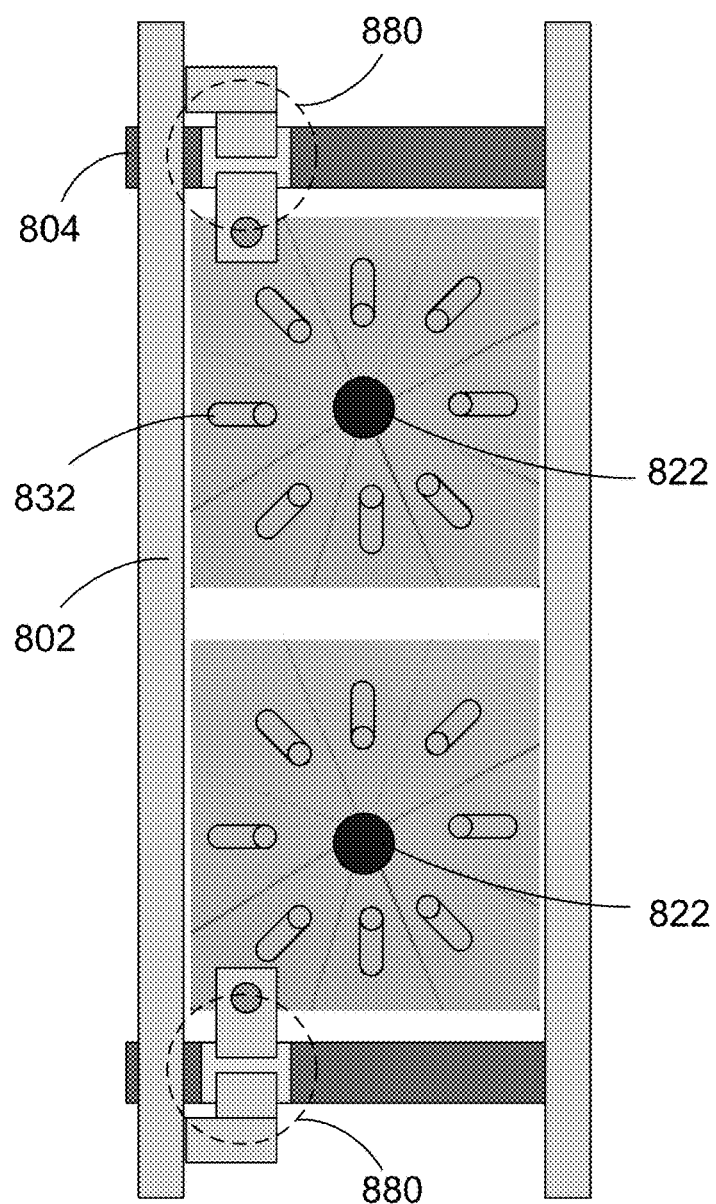
FIG. 8B schematically shows a top view of the pixel structure of a LCD device, where the pixel is divided into two subpixels, according to certain embodiments of the present disclosure.

In certain embodiments, the number of domains of the pixel electrode 740 and the common electrode 750 may be more than 8. FIG. 8A schematically shows a top view of the multiple domains of the pixel electrode and the common electrode of the pixel structure of a LCD device according to certain embodiments of the present disclosure, and FIG. 8B schematically shows a top view of the pixel structure of a LCD device, where the pixel is divided into two subpixels, according to certain embodiments of the present disclosure. As shown in FIGS. 8A and 8B, the pixel structure 800 shows that a pixel is divided into two separate subpixels, with one subpixel on the top and the other sub-pixel on the bottom. As shown in FIG. 8A, the two subpixels share one data line 802, and each of the two subpixels has a corresponding transistor 880 and a corresponding gate line 804, and has a corresponding subpixel electrode 840. In other words, the pixel electrode includes two subpixel electrodes 840, each receiving data signal from different transistors 880. As shown in FIG. 8A, each of the two subpixel electrodes 840 is divided into 8 first domains, such that the pixel electrode includes a total 16 first domains. Similarly, the common electrode 850 also includes 16 corresponding second domains. Each of the 16 first domains of the pixel electrode and each of the 16 second domains of the common electrode is formed by a directional NWGP. The directional NWGP of each of the 16 first domains of the pixel electrode has a first planar direction substantially perpendicular to the vertical direction of the LCD device (i.e., the vertical direction as shown in FIG. 7A), and for each of the two subpixel electrodes 840, the first planar directions of the directional NWGPs of the 8 first domains in each subpixel electrode 840 are different from one another. Specifically, for each of the 8 first domains of each of the two subpixel electrode 840, the first planar direction of the directional NWGP of the first domain is about 45 degrees from the first planar directions of the directional NWGPs of the two neighboring first domains, respectively. The directional NWGP of each of the 16 second domains of the common electrode has a second planar direction substantially perpendicular to the vertical direction and the first planar direction of the directional NWGP of the corresponding first domain of the pixel electrode. As shown in FIG. 8B, two protrusions 822 are provided to be disposed on the common electrode 850, and the 16 second domains of the common electrode 850 are disposed in two groups around the two protrusions 822. Each of the two protrusions 822 can be in a dot shape.

In certain embodiments, in order to improve the image quality of the LCD device, a storage capacitance electrode may be provided in each pixel to form a storage capacitor. However, since the storage capacitance electrode is opaque, the aperture ratio of the pixel may be reduced, resulting in inferior pixel quality. In order to address this deficiency, the storage capacitance electrode may be implemented by the directional NWGP to provide an optical axis parallel to the bottom polarizer of the LCD device.

Figure 9A:
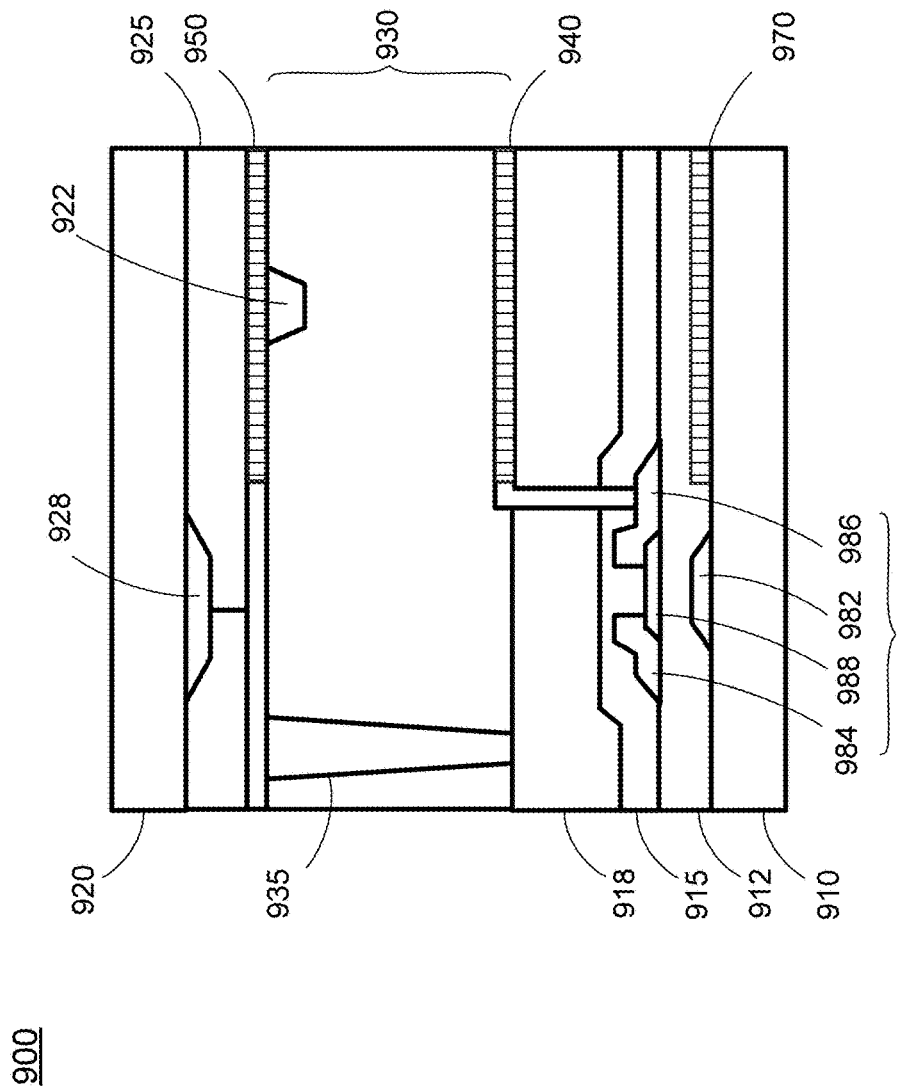
FIG. 9A schematically shows a cross-sectional view of a pixel structure of a LCD device with a multiple domain vertical alignment mode utilizing the nanowire grid polarizers as electrodes according to certain embodiments of the present disclosure.
Figure 9B:
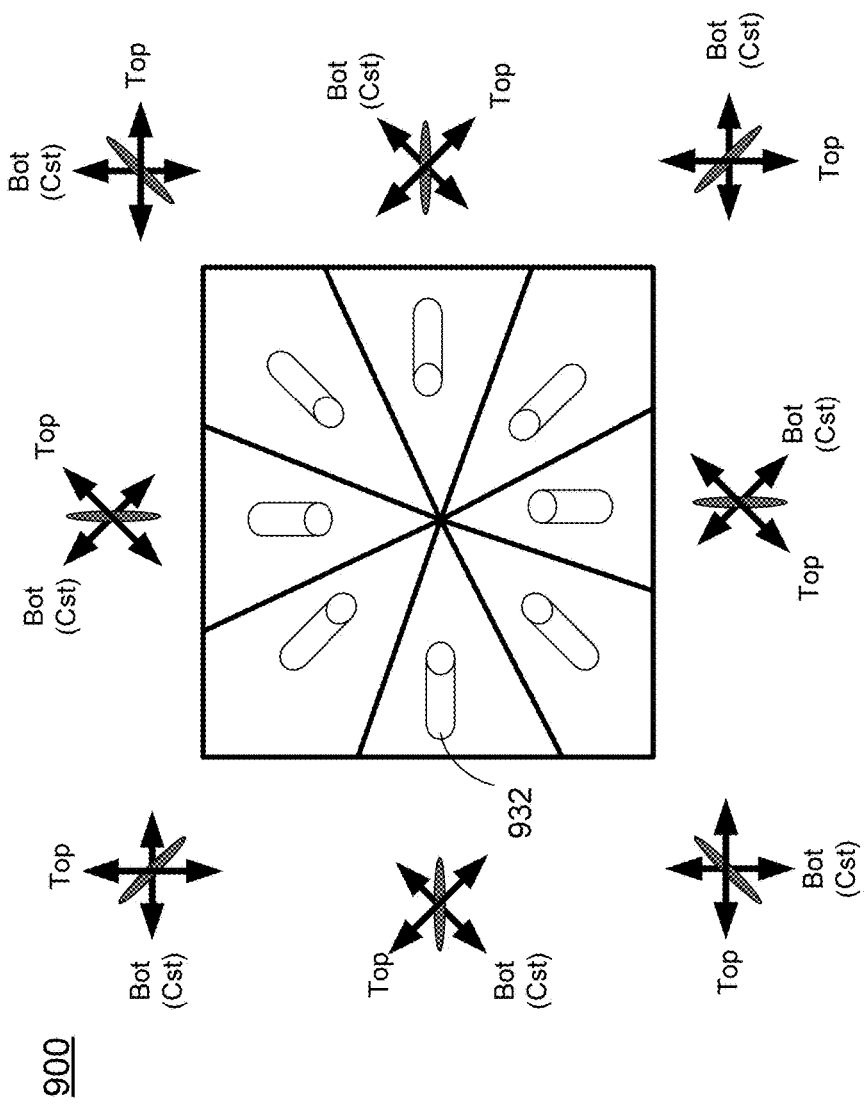
FIG. 9B schematically shows a top view of the liquid crystal molecules of the pixel structure of a LCD device as shown in FIG. 9A according to certain embodiments of the present disclosure.

FIG. 9A schematically shows a cross-sectional view of a pixel structure of a LCD device with a multiple domain vertical alignment mode utilizing the nanowire grid polarizers as electrodes according to certain embodiments of the present disclosure, and FIG. 9B schematically shows a top view of the liquid crystal molecules of the pixel structure of a LCD device as shown in FIG. 9A according to certain embodiments of the present disclosure. Specifically, the pixel structure 900 as shown in FIG. 9A is identical to the pixel structure 700 as shown in FIG. 7A, except that the storage capacitance electrode 970 as shown in FIG. 9A is in a multiple domain structure. Specifically, the storage capacitance electrode 970 is divided into multiple third domains, and each of the third domains of the storage capacitance electrode 970 correspond to a corresponding one of the first domains of the pixel electrode 940 along the vertical direction of the LCD device 900 (i.e., the vertical direction as shown in FIG. 9A). Each of the third domains of the storage capacitance electrode 970 is formed by the directional NWGP, and the directional NWGP of each of the third domains of the storage capacitance electrode 970 has a third planar direction, which is identical to the first planar direction of the directional NWGP of the corresponding first domain of the pixel electrode 940. The first, second and third planar directions of each direction NWGP are more clearly shown in FIG. 9B, where the first planar direction of each directional NWGP of each first domain of the pixel electrode 940 is labeled as "bot," the second planar direction of each directional NWGP of each second domain of the common electrode 950 is labeled as "top," and the third planar direction of each direction NWGP of each third domain of the storage capacitance electrode 970 is labeled as "Cst". As shown in FIG. 9B, for each of the corresponding domains, the first planar direction ("bot") is identical to the third planar direction ("Cst").

In certain embodiments, a plurality of parameters may be determined for domain control of the LCD device, including the distance d between the substrates, the width W and the height of the protrusions. For example, a thickness of the liquid crystal layer along the vertical direction may be about 3.5 um, and the protrusion may have a width of about 10 um and a height of about 1.2 um.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A pixel structure for a liquid crystal display (LCD) device, comprising:
a first substrate and a second substrate spaced apart to each other; and
a liquid crystal layer disposed between the first substrate and the second substrate and having liquid crystal molecules, the liquid crystal layer defining a plurality of pixels, wherein each of the plurality of pixels comprises:
a pixel electrode disposed on the first substrate and facing the liquid crystal layer, wherein the pixel electrode is divided into N first domains, N being a positive integer greater than or equal to 8;
a common electrode disposed on the second substrate and facing the liquid crystal layer, wherein the common electrode is divided into N second domains, each of the N second domains of the common electrode correspond to a corresponding one of the N first domains of the pixel electrode along a vertical direction substantially perpendicular to the first substrate, wherein:
each of the N first domains of the pixel electrode and each of the N second domains of the common electrode is formed by a directional nanowire grid polarizer (NWGP);
the directional NWGP of each of the N first domains of the pixel electrode has a first planar direction substantially perpendicular to the vertical direction, wherein the first planar directions of the directional NWGPs of the N first domains are different from one another, and for each of the N first domains of the pixel electrode, the first planar direction of the directional NWGP of the first domain is about (360/N) degrees from the first planar directions of the directional NWGPs of the two neighboring first domains, respectively; and
the directional NWGP of each of the N second domains of the common electrode has a second planar direction substantially perpendicular to the vertical direction and the first planar direction of the directional NWGP of the corresponding first domain of the pixel electrode;
a thin-film transistor (TFT) disposed on the first substrate, having a gate, a source and a drain, wherein the drain of the TFT is electrically connected to the directional NWGPs of the N first domains of the pixel electrode; and
a protrusion disposed on the common electrode and facing the liquid crystal layer, wherein the N second domains of the common electrode are disposed around the protrusion;
wherein when the pixel electrode and the common electrode are driven by a voltage difference provided by the TFT, the directional NWGPs of the N first domains and the N second domains function as polarizers, such that an orientation of the liquid crystal molecules between each of the N first domains and the corresponding second domain is about (360/N) degrees from the first planar direction and about (360/N) degrees from the second planar direction.

2. The pixel structure of claim 1, wherein each of the pixels further comprises:
a color filter layer disposed between the second substrate and the common electrode; and
a black matrix disposed on the second substrate facing the liquid crystal layer, wherein the black matrix covers an area of the second substrate exposed by the common electrode.

3. The pixel structure of claim 1, wherein a wire grid pitch of the directional NWGP is no greater than 200 nm.

4. The pixel structure of claim 1, wherein a thickness of the liquid crystal layer along the vertical direction is about 3.5 um, and the protrusion has a width of about 10 um and a height of about 1.2 um.

5. The pixel structure of claim 1, wherein each of the plurality of pixels further comprises:
a storage capacitance electrode disposed between the first substrate and the pixel electrode; and
a passivation layer disposed between the storage capacitance electrode and the pixel electrode,
wherein the storage capacitance electrode is formed by the directional NWGP.

6. The pixel structure of claim 5, wherein:
the storage capacitance electrode is divided into N third domains, each of the N third domains of the storage capacitance electrode correspond to a corresponding one of the N first domains of the pixel electrode along the vertical direction;
each of the N third domains of the storage capacitance electrode is formed by the directional NWGP; and
the directional NWGP of each of the N third domains of the storage capacitance electrode has a third planar direction identical to the first planar direction of the directional NWGP of the corresponding first domain of the pixel electrode.

7. The pixel structure of claim 1, wherein the liquid crystal molecules of the liquid crystal layer have a negative dielectric constant anisotropy.

8. A pixel structure for a liquid crystal display (LCD) device, comprising:
a first substrate and a second substrate spaced apart to each other; and
a liquid crystal layer disposed between the first substrate and the second substrate and having liquid crystal molecules, the liquid crystal layer defining a plurality of pixels, and each of the plurality of pixels comprising two subpixels, wherein each of the plurality of pixels comprises:
a pixel electrode disposed on the first substrate and facing the liquid crystal layer, wherein the pixel electrode comprises two subpixel electrodes, and each of the two subpixel electrodes is divided into N first domains, such that the pixel electrode comprises (2*N) first domains, N being a positive integer greater than or equal to 8;
a common electrode disposed on the second substrate and facing the liquid crystal layer, wherein the common electrode is divided into (2*N) second domains, each of the (2*N) second domains of the common electrode correspond to a corresponding one of the (2*N) first domains of the pixel electrode along a vertical direction substantially perpendicular to the first substrate, wherein:

each of the (2*N) first domains of the pixel electrode and each of the (2*N) second domains of the common electrode is formed by a directional nanowire grid polarizer (NWGP);

the directional NWGP of each of the (2*N) first domains of the pixel electrode has a first planar direction substantially perpendicular to the vertical direction, wherein the first planar directions of the directional NWGPs of the N first domains in each of the two subpixel electrodes are different from one another, and for each of the N first domains of each of the two subpixel electrodes, the first planar direction of the directional NWGP of the first domain is about (360/N) degrees from the first planar directions of the directional NWGPs of the two neighboring first domains, respectively; and the directional NWGP of each of the (2*N) second domains of the common electrode has a second planar direction substantially perpendicular to the vertical direction and the first planar direction of the directional NWGP of the corresponding first domain of the pixel electrode;

two thin-film transistors (TFTs) disposed on the first substrate, each having a gate, a source and a drain, wherein the drain of each of the two TFT is electrically connected to the directional NWGPs of the N first domains of the two subpixel electrodes, respectively; and two protrusions disposed on the common electrode and facing the liquid crystal layer, wherein the (2*N) second domains of the common electrode are disposed in two groups around the two protrusions;

wherein when the pixel electrode and the common electrode are driven by a voltage difference provided by the two TFTs, the directional NWGPs of the (2*N) first domains and the (2*N) second domains function as polarizers, such that an orientation of the liquid crystal molecules between each of the (2*N) first domains and the corresponding second domain is about (360/N) degrees from the first planar direction and about (360/N) degrees from the second planar direction.

9. The pixel structure of claim 8, wherein each of the pixels further comprises:

a color filter layer disposed between the second substrate and the common electrode; and a black matrix disposed on the second substrate facing the liquid crystal layer, wherein the black matrix covers an area of the second substrate exposed by the common electrode.

10. The pixel structure of claim 8, wherein a wire grid pitch of the directional NWGP is no greater than 200 nm.

11. The pixel structure of claim 8, wherein a thickness of the liquid crystal layer along the vertical direction is about 3.5 um, and each of the protrusions has a width of about 10 um and a height of about 1.2 um.

12. The pixel structure of claim 8, wherein each of the pixels further comprises:

a storage capacitance electrode disposed between the first substrate and the pixel electrode; and a passivation layer disposed between the storage capacitance electrode and the pixel electrode, wherein the storage capacitance electrode is formed by the directional NWGP.

13. The pixel structure of claim 12, wherein:

the storage capacitance electrode is divided into (2*N) third domains, each of the (2*N) third domains of the storage capacitance electrode correspond to a corresponding one of the (2*N) first domains of the pixel electrode along the vertical direction;

each of the (2*N) third domains of the storage capacitance electrode is formed by the directional NWGP; and the directional NWGP of each of the (2*N) third domains of the storage capacitance electrode has a third planar direction identical to the first planar direction of the directional NWGP of the corresponding first domain of the pixel electrode.

14. The pixel structure of claim 8, wherein the liquid crystal molecules of the liquid crystal layer have a negative dielectric constant anisotropy.

15. A pixel structure for a liquid crystal display (LCD) device, comprising:

a first substrate and a second substrate spaced apart to each other; and a liquid crystal layer disposed between the first substrate and the second substrate and having liquid crystal molecules, the liquid crystal layer defining a plurality of pixels, wherein each of the plurality of pixels comprises:

a pixel electrode disposed on the first substrate and facing the liquid crystal layer, wherein the pixel electrode is divided into N first domains, N being a positive integer greater than or equal to 8;

a common electrode disposed on the second substrate and facing the liquid crystal layer, wherein the common electrode is divided into N second domains, each of the N second domains of the common electrode correspond to a corresponding one of the N first domains of the pixel electrode along a vertical direction substantially perpendicular to the first substrate; and a protrusion located on the common electrode and configured to guide the liquid crystal molecules driven by the pixel electrode and the common electrode to exhibit at least N different tilted orientations, wherein each of the N first domains of the pixel electrode and each of the N second domains of the common electrode is formed by a directional nanowire grid polarizer (NWGP);

wherein a first planar direction of the directional NWGP of each of the N first domains of the pixel electrode is substantially perpendicular to a second planar direction of the directional NWGP of each of the N second domains of the common electrode;

wherein for each of the N first domains of the pixel electrode, the first planar direction of the directional NWGP is about (360/N) degrees from the first planar direction of the directional NWGP of each of the two neighboring first domains of the pixel electrode; and wherein for each of the N second domains of the common electrode, the second planar direction of the directional NWGP is about (360/N) degrees from the second planar direction of the directional NWGP of each of the two neighboring second domains of the common electrode.

16. The pixel structure of claim 15, wherein the protrusion is fully located on the common electrode and is roughly in a dot shape.

17. The pixel structure of claim 15, wherein each of the pixels further comprises:

a color filter layer disposed between the second substrate and the common electrode; and a black matrix disposed on the second substrate facing the pixel electrode, wherein the black matrix covers an area of the second substrate exposed by the common electrode.

18. The pixel structure of claim 15, wherein a wire grid pitch of the directional NWGP is no greater than 200 nm, a thickness of the liquid crystal layer is about 3.5 um, and the protrusion has a width of about 10 um and a height of about 1.2 um.

19. The pixel structure of claim 15, each of the pixels further comprises:
  a storage capacitance electrode disposed on the first substrate and facing the second substrate; and
  a passivation layer disposed between the storage capacitance electrode and the pixel electrode,
  wherein the storage capacitance electrode is formed by the directional NWGP.

20. The pixel structure of claim 19, wherein:
the storage capacitance electrode is divided into N third domains, each of the N third domains of the storage capacitance electrode correspond to a corresponding one of the N first domains of the pixel electrode;
each of the N third domains of the storage capacitance electrode is formed by the directional NWGP; and
the directional NWGP of each of the N third domains of the storage capacitance electrode has a third planar direction identical to the first planar direction of the directional NWGP of the corresponding first domain of the pixel electrode.

21. The pixel structure of claim 15, wherein:
for each of the N first domains of the pixel electrode, the corresponding second domain of the common electrode with the second planar direction of the directional NWGP substantially perpendicular to the first planar direction of the directional NWGP of the first domain is directly facing to the first domain of the pixel electrode.

* * * * *